Figure 1:
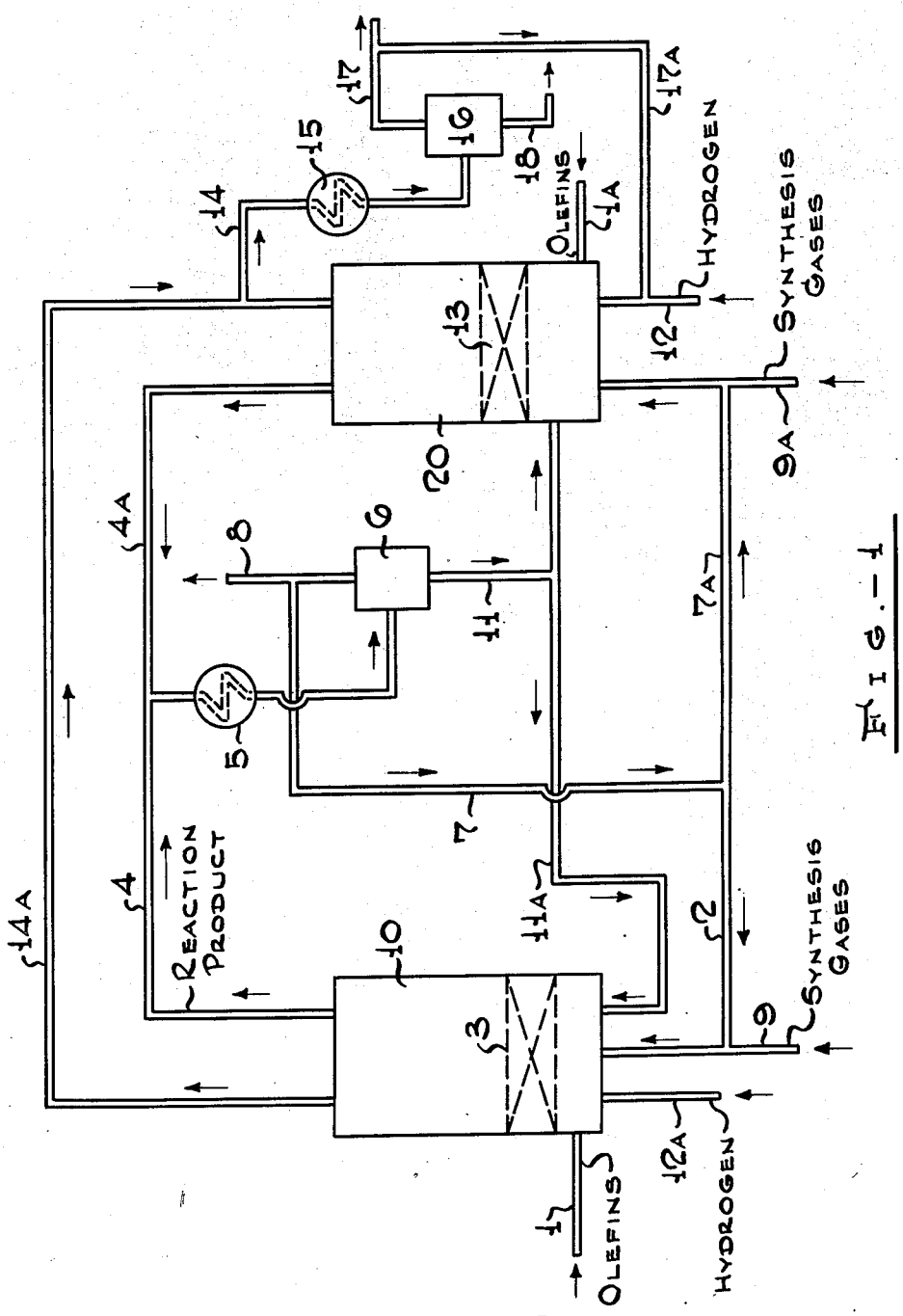
Figure 2:
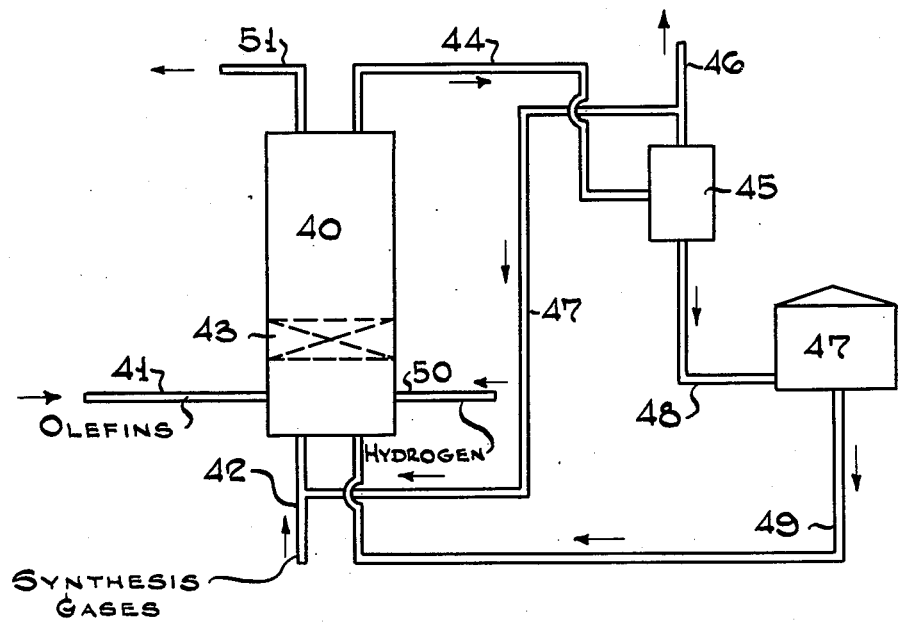
Figure 3:
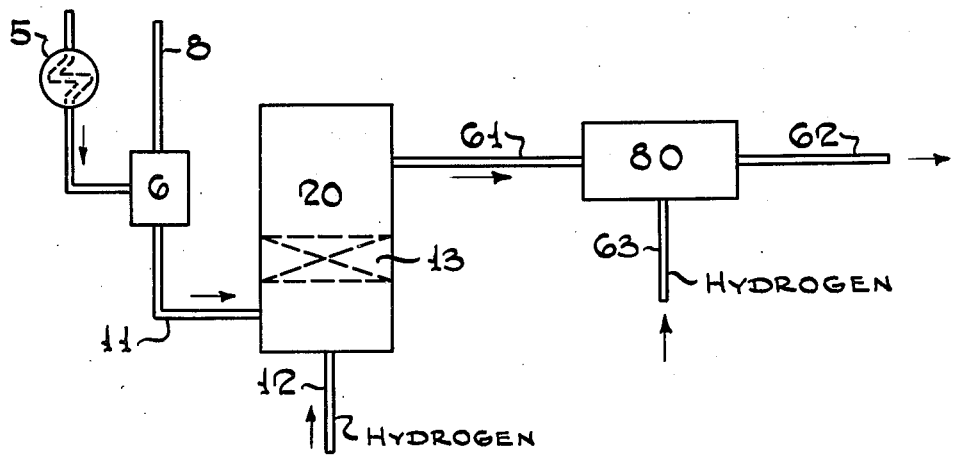
Figure 4:
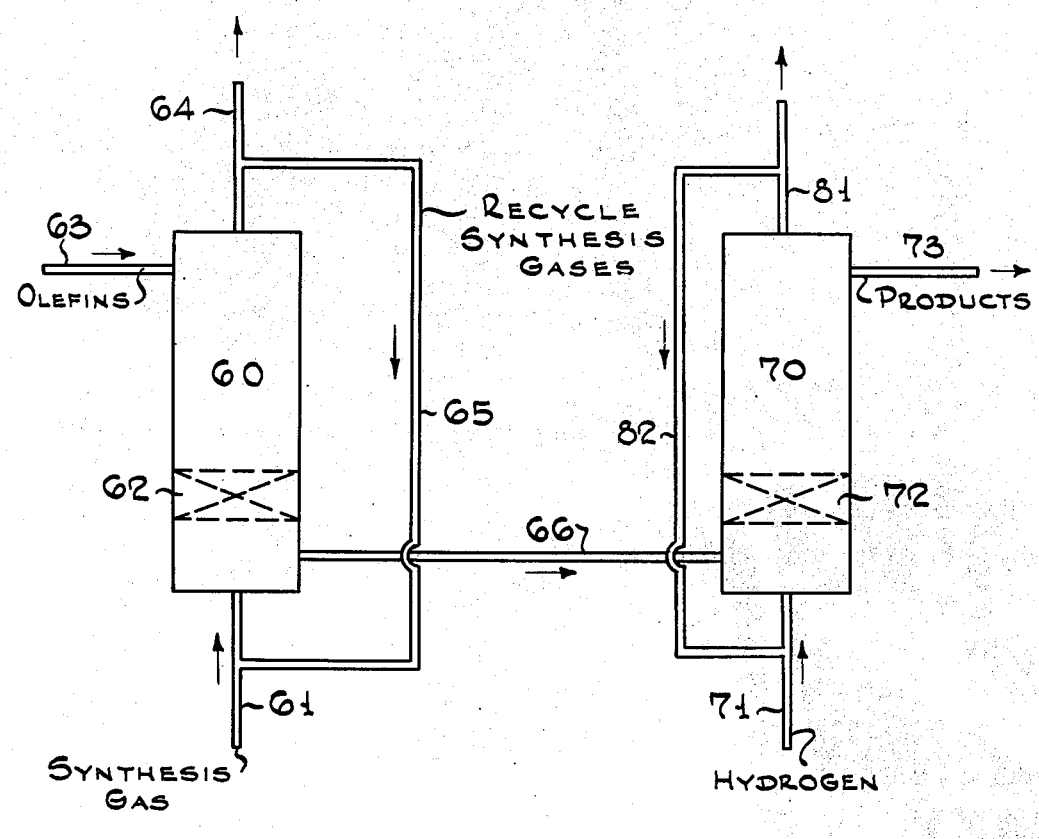

Paul T. Parker
George O. Hillard, Jr. Inventors

By P. J. Whelan Attorney

Patented Oct. 16, 1951

2,571,160

UNITED STATES PATENT OFFICE 2,571,160

OXO SYNTHESIS PROCESS

Paul T. Parker and George O. Hillard, Jr., Baton Rouge, La., assignors to Standard Oil Development Company, a corporation of Delaware Application October 25, 1946, Serial No. 705,706

4 Claims. (Cl. 260—638)

The present invention relates to a process for the production of oxo products in a hydrocarbon synthesis reaction. The invention is more particularly concerned with an improved process for producing oxygenated products comprising alcohols utilizing a cobalt or equivalent catalyst. In accordance with the present invention a continuous process is employed for the production of oxo synthesis products which preferably comprises the utilization of two reaction zones. In accordance with the invention, feed comprising olefins together with synthesis gas is introduced into an initial reaction zone containing cobalt catalyst. The liquid reaction product from the initial reaction zone is then introduced into a secondary reaction zone containing cobalt catalyst along with hydrogen. Thus, the cobalt carbonyl which is formed in the initial reaction zone is decomposed and the cobalt collects in the cobalt bed of the secondary reaction zone. After the cobalt in the initial reaction zone is depleted to a predetermined critical minimum quantity, the flow of the streams is reversed with respect to the initial and secondary reaction zones.

It is known in the art to use various catalysts in fixed beds or in fluidized beds for many treating operations. In fluidized operations small subdivided solids or catalysts having a particle size in the range from about 20 to 200 microns and higher are suspended in a fluid ebullient state by means of upflowing suspending gases. The velocity of the upflowing gases varies in the general range from about 0.5 to 5 feet per second and higher. It is also known in the art to conduct hydrocarbon synthesis reactions by contacting feed gases comprising carbon monoxide and hydrogen with a suitable catalyst generally selected from the class consisting of iron, cobalt and nickel. These reactions are conducted at a temperature generally in the range from about 300 to 750° F. and at a pressure which varies from 50 pounds to 750 pounds and higher. Here again the catalyst may be either in a fixed bed or in a fluidized state.

In these reactions it is also known in the art to utilize olefins to produce alcohols by means of the oxo synthesis. This reaction involves reacting the olefins with a mixture of carbon monoxide and hydrogen in the presence of a cobalt containing catalyst to form an aldehyde which is hydrogenated to the corresponding alcohol. The ratio of hydrogen to carbon monoxide may vary appreciably. Ratios of 0.5 volume of hydrogen to 4.0 volumes of hydrogen per volume of carbon monoxide are employed. The preferred ratios comprise about 1.0 volume of hydrogen per volume of carbon monoxide. The quantities of olefins employed per volume of synthesis gas likewise vary considerably as well as the composition of the olefin feed stream. The oxo synthesis reaction is generally conducted employing a pressure in the range of about 100 to 300 atmospheres and a temperature in the range of about 200° F. to 400° F.

In these oxo processes in which a cobalt catalyst is utilized, one problem encountered is the fact that cobalt reacts under the conditions of the synthesis process to form cobalt carbonyl. The cobalt carbonyl remains dissolved in the reaction products and is removed from the reaction zone resulting in the depletion of the essential catalyst. Subsequently, upon hydrogenation of the aldehyde, the cobalt carbonyl is reduced resulting in the depositing of the cobalt in the hydrogenation reaction zone.

Various suggestions and proposals have been directed toward overcoming this problem. For example, it has been suggested that a finely divided slurry of cobalt catalyst be utilized in the first stage and be removed from the reaction zone and filtered after the oxo reaction. This product is given a preliminary hydrogenation treatment to reduce the dissolved cobalt carbonyl to the metal before the final hydrogenation of the aldehyde to alcohol over a separate and different hydrogenation catalyst. This procedure is not entirely satisfactory due to the fact that it is necessary to pump a solids-containing slurry and also due to the fact that it is necessary to filter the product and to recover the catalyst. Another procedure suggested is that a cobalt salt of an organic acid be dissolved in the feed to the oxo synthesis zone. Organic salts are, for example, the salts of naphthenates, stearates, and equivalent fatty acids. This latter procedure is also not entirely satisfactory for the reasons enumerated above.

We have now discovered a process which substantially completely overcomes the disadvantages resulting from the formation of cobalt carbonyl. Our process preferably utilizes two reaction zones although it is possible to employ a single reaction zone. As stated, our method preferably utilizes the use of two fixed bed reaction zones in series. Each reactor is packed with a supported cobalt-type catalyst. In operation, olefin feed is fed to the initial reactor through which synthesis gas is preferably recycled. The liquid oxo product from the initial reactor is fed to a secondary reactor through which hydrogen is recycled. Cobalt carried from the initial reactor as cobalt carbonyl dissolved in the product is deposited on the catalyst support in the secondary reactor. After the cobalt in the initial reaction zone is depleted to a predetermined minimum quantity, the flow of the streams is reversed with respect to the initial and secondary reaction zones. Thus, by periodic reversal of the function of the two reactors it is possible to operate continuously with a fixed bed catalyst with substantially little loss of cobalt from the system. Periodic recovery of the cobalt is not required. Small cobalt losses may be compensated for by introducing cobalt carbonyl or a cobalt salt of a fatty acid into the olefin feed.

In the second procedure a single reactor is employed. The operation is conducted in the normal fashion. The olefins are introduced into the reactor which is packed with a supported cobalt type catalyst. The synthesis gas is preferably recycled through the reactor. The effluent aldehyde product is collected in a separate reservoir. After a certain period of operation, the olefin feed and synthesis gas recycle are discontinued. The aldehyde product is then pumped through the reactor and hydrogen recycled to effect hydrogenation of the aldehyde and reduction of the cobalt carbonyl with redeposition of the cobalt on the catalyst. After reduction of the collected aldehyde, the oxo operation is resumed as before. Thus, a single reactor suffices for both the oxo and hydrogenation steps with complete catalyst retention in the system.

The process of our invention may be more readily understood by reference to the attached drawings illustrating modifications and embodiments of the same. Figure I illustrates the preferred embodiment of our invention utilizing two reaction zones operating in series. Figure II illustrates an embodiment of our invention employing a single reaction zone. Figure III illustrates an embodiment of our invention wherein two reaction zones operating in series are handled in a manner to secure two-stage hydrogenation while Figure IV illustrates a countercurrent operation.

Referring specifically to Figure I, a liquid comprising olefins is introduced into reaction zone 10 by means of feed line 1. Synthesis gases are likewise introduced into reaction zone 10 by means of line 2. For the purpose of illustration, it is assumed that the olefin feed comprises olefins having from about 2 to 18 carbon atoms in the molecule. The composition of the synthesis gases comprise about 44% carbon monoxide and about 55% hydrogen. These gases pass upwardly through a bed of cobalt 3 disposed within reaction zone 10. Suitable distributing and contacting means are employed. Reaction zone 10 is maintained at a temperature in the range from about 250° F. to 400° F. and at a pressure in the range from about 100 to 300 atmospheres. The reaction products are withdrawn overhead from zone 10 by means of line 4, cooled in cooling zone 5 and introduced into separation zone 6. Uncondensed gases are removed overhead from separation zone 6 and are preferably recycled to zone 10 by means of line 7. These gases, however, may be withdrawn from the system by means of line 8. Fresh synthesis gases may be introduced into zone 10 by means of line 9. The liquid product is withdrawn from separation zone 6 by means of line 11 and introduced into the bottom of secondary reaction zone 20. Gases comprising hydrogen are also introduced into the bottom of reaction zone 20 by means of line 12. The liquid product and the hydrogen pass upwardly through a cobalt catalytic bed 13 disposed within reaction zone 20. The temperature in zone 20 is maintained in the range from about 250° F. to 400° F. while the pressure is in the range from about 100 to 200 atmospheres. In general, the time of contact will be in the range of about 15 to 60 minutes and longer. Reaction products are removed overhead from zone 20 by means of line 14, cooled in cooling zone 15 and passed to separation zone 16. Uncondensed vapors are removed overhead from zone 16 by means of line 17. These vapors may be withdrawn from the system but are preferably recycled to the bottom of zone 20 by means of line 17A. The hydrogenated product is removed from the bottom of zone 16 by means of line 18 and handled in any manner desirable.

When the concentration of cobalt in the initial reactor 10 is depleted to a predetermined minimum effective limit, the flow of the respective streams entering and leaving zones 10 and 20 are reversed. Under these conditions olefins are introduced into zone 20 by means of line 1A while synthesis gases are introduced into zone 20 by means of line 9A. Reaction products are withdrawn overhead from zone 20 by means of line 4A, passed through cooling zone 5 and introduced into separation zone 6. Uncondensed vapors are removed from the system by means of line 8 but are preferably recycled to zone 20 by means of lines 7 and 7A. The condensed liquid product is removed from zone 6 and introduced into the bottom of zone 10 by means of lines 11 and 11A. Hydrogen gases are introduced into the bottom of zone 10 by means of line 12A. The reaction products are removed overhead from zone 10 by means of lines 14A and 14 and handled as hereinbefore described.

Referring specifically to Figure II, olefins are introduced into zone 40 by means of line 41. Synthesis feed gases comprising carbon monoxide and hydrogen are introduced into zone 40 by means of line 42. These gases flow upwardly in zone 40 through a cobalt catalyst bed 43 disposed in zone 40. Temperature and pressure conditions in zone 40 are adapted to secure the desired oxo synthesis reaction. The reaction products are removed from zone 40 by means of line 44 and introduced into separation zone 45. Uncondensed gases are removed overhead from separation zone 45 and may be withdrawn from the system by means of line 46 but are preferably recycled to reaction zone 40 by means of line 47. The liquid product comprising aldehydes and cobalt carbonyl is passed to storage zone 47 by means of line 48.

After the cobalt bed in zone 40 is depleted to a predetermined minimum critical quantity, the flow of olefins and synthesis gas into reaction zone 40 is discontinued. At this point, the product stored in zone 47 is withdrawn by means of line 49 and reintroduced into zone 40 together with hydrogen which is introduced into zone 40 by means of line 50. Temperature and pressure conditions and time of contact in zone 40 are adjusted to hydrogenate the olefins and to decompose the cobalt carbonyl to cobalt which is deposited in bed 43. The hydrogenated product comprising alcohols free of cobalt carbonyl is withdrawn from zone 40 by means of line 51 and handled in any manner desirable.

Referring specifically to Figure III illustrating a detailed embodiment of the process illustrated by Figure I, the product from the oxo synthesis zone 10 comprising aldehydes and cobalt carbonyl is introduced into zone 20 by means of line 11. For the purpose of simplicity, similar units in Figures I and III are illustrated by the same numerals. Cooling zone 5, separation zone 6, and vapor line 8 are operated in a manner described with respect to Figure I. The product from the oxo synthesis zone is introduced into the bottom of zone 20 by means of line 11 and passes upwardly through cobalt bed 13. Hydrogen is introduced into zone 20 by means of line 12. Temperature and pressure conditions in zone 20 are adjusted to secure decomposition of the cobalt carbonyl to cobalt which metal is deposited into bed 13. However, the hydrogenation conditions are not sufficiently severe to hydrogenate the aldehydes to alcohols. The product stream free of cobalt carbonyl is withdrawn from zone 20 by means of line 61 and passed to a secondary hydrogenation zone 80. Additional hydrogen is introduced into secondary hydrogenation zone 80 by means of line 63 to hydrogenate the aldehydes to the corresponding alcohols which alcohols are withdrawn by means of line 62 and handled in any manner desirable. It is to be understood that when zone 20 is operated as the oxo synthesis zone and zone 10 is operated as the hydrogenation zone, a similar process may be employed with respect to the hydrogenation in zone 10.

Referring specifically to Figure IV, synthesis gases comprising carbon monoxide and hydrogen are introduced into reaction zone 60 by means of line 61. Reaction zone 60 contains a cobalt catalyst 62 disposed therein. Olefins are introduced into the top of reaction zone 60 by means of line 63. Operating conditions within zone 60 are adapted to secure the desired oxo reaction. Gases are withdrawn overhead from zone 60 by means of line 64 and are preferably recycled to zone 60 by means of line 65. A liquid reaction product containing oxo compounds and cobalt carbonyl is withdrawn from zone 60 by means of line 66 and introduced into secondary reaction zone 70. Reaction zone 70 is handled in a manner similar to that described with respect to reaction zone 20. Hydrogen is introduced into zone 70 by means of line 71 and the cobalt carbonyl decomposes to cobalt and collects in cobalt bed 72 disposed within zone 70. The hydrogenated reaction products are removed from zone 70 by means of line 73 and may be handled in any manner desirable. After the cobalt in zone 60 has reached a predetermined minimum critical amount, the flow of the streams with respect to zones 60 and 70 are reversed in a manner similar to that described with respect to Figure I. Gases comprising hydrogen may be withdrawn from zone 70 by means of line 81 and recycled with the fresh hydrogen by means of line 82.

Although our invention is particularly adapted to a process employing a cobalt catalyst, it may also be utilized when equivalent catalysts are employed, as for example, nickel. It is also to be understood that the catalyst may comprise any suitable material, as for example, thoria, magnesia, copper, and the like. The olefin mixture may comprise pure olefins or may comprise olefins containing hydrocarbons and the like. In general, it is preferred that the olefins comprise olefins having from 2 to 18 carbon atoms in the molecule. Particularly desirable olefins comprise hydrocarbons having from about 8 to 18 carbon atoms in the molecule. In the hydrogenation step, any catalyst, as for example, nickel, tungsten, or sulfides of group VI and group VIII metals may be utilized. The hydrogenation temperatures are generally in the range from about 150° F. to 450° F. while the pressures are usually in the range of about 100 to 300 atmospheres. The quantity of synthesis gas with respect to olefins utilized may vary considerably as, for example, from 1000 to 45,000 cu. ft. of carbon monoxide and hydrogen per barrel of olefin feed. In general, approximately 2,500 to 15,000 cu. ft. of synthesis gas per barrel of olefin feed is employed.

The process of our invention is not to be limited by any theory as to mode of operation, but only in and by the following claims in which it is desired to claim the novelty insofar as the prior art permits.

We claim:

1. In an oxo synthesis reaction wherein olefins, carbon monoxide and hydrogen are charged to an initial oxo production zone containing a bed of active carbonylation metal catalyst under conditions adapted to produce reaction products comprising aldehydes containing one more carbon atom than said olefins and wherein catalyst metal compounds comprising the carbonyls of said metals are formed and are dissolved in said reaction products, the steps comprising maintaining in operating series an oxo production, a catalyst removal, and an oxo product reduction zone, withdrawing a solution comprising said oxo reaction products and containing therein dissolved catalyst metal compounds from said oxo production zone and charging it to said catalyst removal zone, maintaining an elevated temperature in said catalyst removal zone so as substantially to decompose said metal catalyst compounds and to deposit catalyst metal on a solid carrier material, charging a stripping gas to said catalyst removal zone, withdrawing said stripping gas and stripped carbon monoxide from said catalyst removal zone, withdrawing substantially unreduced aldehydic oxo product, substantially free of dissolved catalyst from said catalyst removal zone, passing said aldehydic product to said oxo product reduction zone, and periodically reversing the flow of material with respect to said initial reaction zone and said catalyst removal zone when the catalyst in said initial zone has reached a predetermined critical minimum amount.

2. The process of claim 1 wherein said active metal carbonylation catalyst comprises cobalt.

3. The process of claim 1 wherein said stripping gas is hydrogen.

4. The process of claim 1 comprising the steps of withdrawing reaction products from said initial reaction zone and passing the same to a separation zone, separating liquid products from uncondensed gases in said separation zone, segregating said liquid products containing in solution carbonyl of the catalyst in a storage zone, discontinuing the flow of olefins, carbon monoxide and hydrogen to said initial reaction zone when the quantity of metal catalyst has reached a predetermined critical minimum amount, introducing said liquid product from said storage zone into said initial reaction zone, maintaining catalyst removal conditions in said last named zone, whereby the carbonyl of the catalyst is decomposed to carbon monoxide and the catalyst metal deposited on said catalyst bed in said last named zone, passing a stripping gas through said zone to remove carbon monoxide, and withdrawing an aldehydic liquid product from said zone.

PAUL T. PARKER.
GEORGE O. HILLARD, Jr.

REFERENCES CITED

The following references are of record in the file of this patent:

UNITED STATES PATENTS

| Number | Name | Date |
|---|---|---|
| 1,973,662 | Schalch | Sept. 11, 1934 |
| 2,250,421 | Riblett | July 22, 1941 |
| 2,313,661 | Montgomery | Mar. 9, 1943 |
| 2,324,746 | Weinrich et al. | July 20, 1943 |
| 2,327,066 | Roelen | Aug. 17, 1943 |
| 2,437,600 | Gresham et al. | Mar. 9, 1948 |

OTHER REFERENCES

"Chemical and Metallurgical Engineering," vol. 53, page 224 (January 1946).

U. S. Naval Technical Mission in Europe, "The Synthesis of Hydrocarbons and Chemicals from CO and $H_2$," Technical Report No. 248-45, September 1945, published as PB-22841 (abstract) (listed in Bibliography of Scientific and Industrial Reports, Dept. of Commerce, OTS, vol. 2, No. 5, page 321, August 2, 1946), pages 122-24.